May 7, 1940.   J. MUROS   2,200,185
SHAVING IMPLEMENT
Filed March 12, 1936
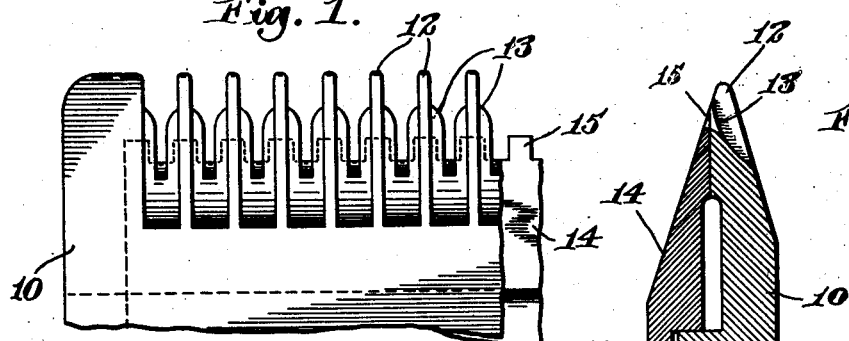
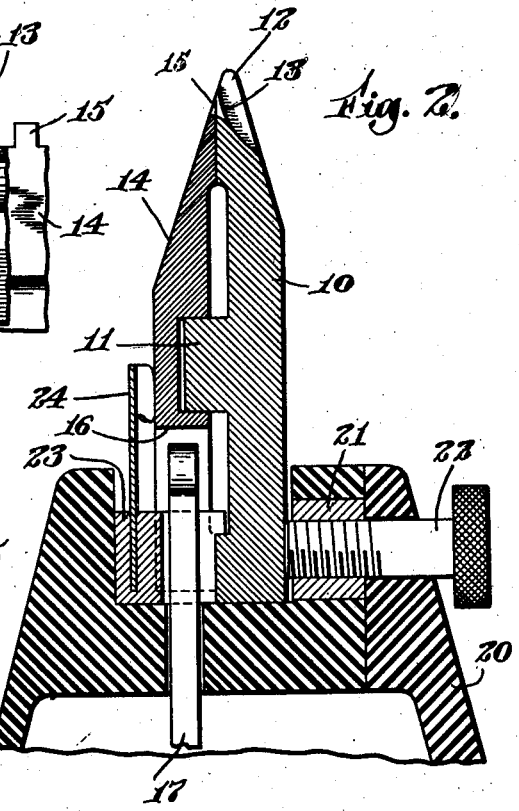
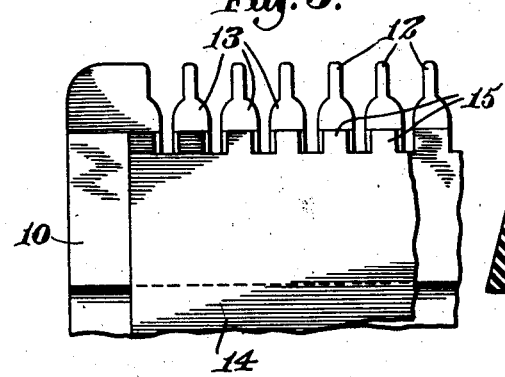
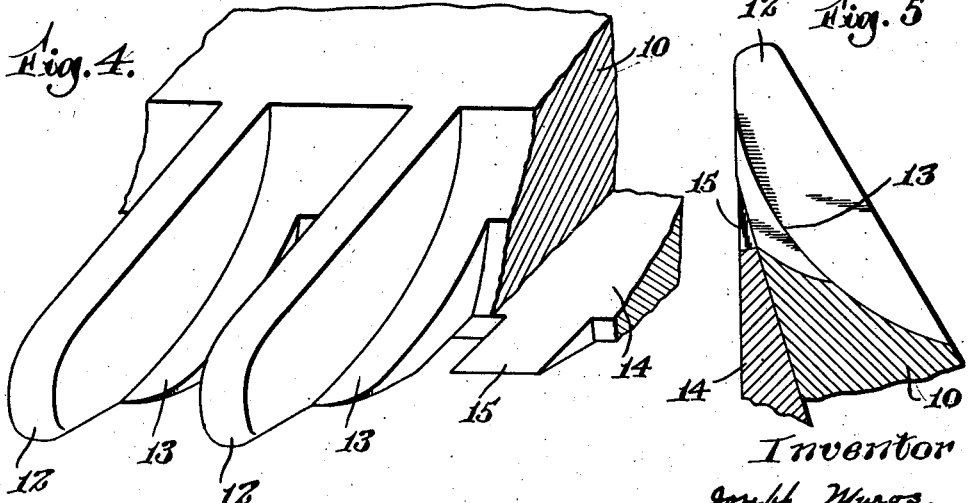
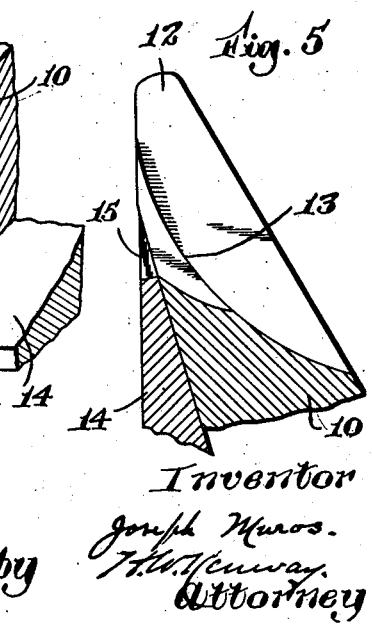
Inventor
Joseph Muros.
by
Attorney Patented May 7, 1940

2,200,185

UNITED STATES PATENT OFFICE 2,200,185

SHAVING IMPLEMENT

Joseph Muros, Cambridge, Mass., assignor to Gillette Safety Razor Company, Boston, Mass., a corporation of Delaware Application March 12, 1936, Serial No. 68,491

9 Claims. (Cl. 30—43)

This invention relates to implements of the vibratory shear type employed for shaving without use of lather. Heretofore such implements have not been entirely satifactory to many users because they tend to leave a noticeable stubble on the face and their operation does not compare favorably in this respect to the results secured by the use of a razor.

Objects of the present invention are to provide a closer cutting implement than has been available heretofore, and in general, to improve the construction and convenience of manipulation and safety of implements of this class. An important feature of the invention consists in a shear plate having a series of projections in each of which is incorporated a guard fin and a thin edged lifting blade. I have discovered that by providing a series of thin, round-end fins disposed substantially perpendicular to the shearing plane I am able to control the skin being shaved, keeping it under tension between the fins so that the effective edges of the shearing teeth may be brought to bear directly on the skin without danger of cutting. The length of the stubble is thus reduced to a minimum. Moreover, the lifting blades are effective to lift and straighten individual hairs, which may have been laid over upon the skin, and to present them to the shearing teeth in upright position so that they may be cut to the best advantage. In the embodiment of the invention herein shown, each guard fin is provided with lifting blades on both sides thereof and the advance edges of the blades are shaped not only to lift the hairs to be operated on as above explained but to direct them into the opening of the shear teeth.

Other features of the invention relate to certain proportions and relative dimensions of the guard fins, lifting blades and co-operating shear teeth which I have discovered are of value in contributing to a close cutting operation of the implement. For example, it is advantageous to limit the opening between the lifting blades to .008 of an inch, a width less than the usual combined width of two hairs, in order that when a hair has once reached this position it may not have an opportunity to become bent over but must be cut in upright position and with a substantially square cut. The toothed shear plates taper forwardly to a vertex and I have found that it is advantageous to limit the depth of the teeth to about .020 of an inch because a hair sheared even in the innermost position in such a tooth will leave no appreciable stubble. It is also important that the spaces between the teeth of the movable plate be greater than the spaces between the teeth of the stationary plate in order to insure the complete cutting of every hair introduced into the tooth space and to eliminate all tendency to kick out. While these dimensions and proportions may be varied, those suggested result in the best and most satisfactory operation of the device and materially contribute to the desired results.

Another feature of the invention consists in co-operating shear plates both tapering to a common vertex contained wholly within one of the plates. Preferably, moreover, the two shear plates are ground together so as to present a single inclined skin-engaging surface of substantial area which includes their common line of contact. This again is a feature which contributes to the production of a close cutting implement.

These and other features of the invention will be best understood and appreciated from the following description of a preferred embodiment thereof, selected for purposes of illustration and shown in the accompanying large scale drawing in which—

Fig. 1 is a fragmentary plan view of the implement as seen from above;

Fig. 2 is a view of the implement in cross-section;

Fig. 3 is a fragmentary plan view of the implement as seen from below;

Fig. 4 is a fragmentary view in perspective and on a greatly enlarged scale of the co-operating shear plate; and Fig. 5 is a corresponding view in cross-section, suggesting a slight modification in the relation of the shear plates.

The implement comprises an elongated casing which serves also as a handle and from the forward end of which project the two shear plates 10 and 14. The upper end only of the casing is shown in Fig. 2 and within the body thereof is housed a small electric motor which is connected through an actuating lever 17 to the movable shear plate 14. By these means the movable shear plate is maintained in a state of rapid vibration when the implement is in use.

The stationary shear plate 10 is provided in its inner face with a longitudinal rib 11, which is defined by two recessed areas in the face of the plate. Its upper edge is beveled and serrated to form a series of thin spaced guard fins 12. On both sides of each guard fin is formed a curved lifting blade 13. The ends of the guard fins 12 are rounded so that they engage the face of the user smoothly, stretching the skin in the intermediate spaces between them and holding it under sufficient tension to prevent it from entering the space between the shearing teeth of the two plates. The lifting blades 13 lie flat on the skin and do not extend to the outer ends of the guard fins 12 but terminate in a blade-edge located about .03" behind the front or outer edge of the guard fins. The lifting blades are curved sharply upwardly and rearwardly in a concave curve. Their principal function is to engage and lift any hairs which do not stand upright upon the face of the user. The outer ends of the lifting blades are rounded so that the blades also function to direct these hairs into the space between them. In a preferred embodiment of the invention this space is made .008", that is to say, wide enough to admit only a single hair at a time and to hold it against being bent over at an acute angle. The under face of each lifting blade 13 is flattened and ground to act as a shear surface in co-operation with the movable teeth of the implement.

The movable plate 14 is provided with square teeth 15 in its front edge. Its inner surface bears against the surface of the stationary plate 10, defining therewith the shearing plane, as shown in Fig. 2, and the root line of the teeth 15 coincides substantially with the root line of the spaces between the lifting blades 13. The movable plate is provided on its inner face with a channel of rectangular cross-section which fits over the rib 11 and thus the plate 14 is guided accurately in its reciprocation with respect to the stationary plate 10. In a preferred embodiment of the invention the movable plate 14 is bevelled at an angle of 16°, the space between adjacent teeth is .016 of an inch and the length or depth of the teeth is .020 of an inch. While these exact dimensions are not essential they are desirable since they bring the cutting area of the implement into a zone where the hair will be cut off with a minimum length of stubble.

As shown in Fig. 2, the stationary plate is clamped in position in the casing 20 by means of a knurled-head bolt 22 which passes through a nut 21 locating within the end of the casing and an oppositely disposed filler piece 23. The latter is cut away to permit the passage of the actuating lever 17 and bears upon the opposite side of the stationary plate 10 from the retaining bolt 22. The vibratory plate 14 is provided with a recess 16 for the rounded head of the operating lever 17 and this plate is held at all times firmly against the stationary plate 10 by means of a stiff spring 24 set in the filler piece 23.

As shown in Fig. 2, the ends of the shear plates 10 and 14 are ground to a common taper whose vertex is formed in the rounded ends of the guard fins 12. The skin-engaging face of the implement is consequently formed partly by the fins 12 and the lifting blades 13 of the stationary plate 10 and partly by the beveled face of the vibratory plate 14. This contact surface of the implement is a flush surface formed by grinding the assembled plates and it makes an acute angle with the shearing plane as determined by the engaged faces of the two plates. This undershot construction contributes still further to the production of a close cutting implement.

In operation the implement is advanced upon the face of the user with the lower plate 14 next to the surface to be shaved in a state of rapid vibration. The fins 12 and lifting blades 13 co-operate to tension the skin and to lift and deflect the hairs into the space between adjacent lifting blades and then, in the advancing movement of the implement, to guide the hairs into the recesses between the vibrating teeth 15 of the movable shear plate. The movement of this plate is thereupon effective to shear the hairs against the under-shearing surfaces of the stationary plate. In an implement constructed in accordance with the dimensions herein shown the maximum length of stubble will be less than .002", this corresponding to the innermost position between the teeth 16 which any single hair can reach in an upright position. On the other hand, the majority of hairs are cut before they reach the innermost end of the teeth 15 and accordingly leave no discernible stubble.

I wish to note again as a feature of practicable importance the fact that the lifting blades are divergently curved at their outer ends and then merge into straight shearing edges immediately behind their divergent portions. These divergent edges are effective in directing the hairs into the shearing zone and then the straight edges are utilized immediately to shear them very close to the skin of the user.

In Fig. 5 is shown a modification of the two shear plates in respect to their contact surface. Instead of being flush as shown in Fig. 2, the surface of the vibratory plate 14 in this case may be slightly offset with respect to the contact surface of the stationary shear plate 10.

Having thus described my invention what I claim as novel and desire to secure by Letters Patent of the United States is:

1. A shaving implement comprising co-operating relatively movable plates both provided with shearing projections, each of the projections on one plate including a rounded guard fin and a thin-edged lifting blade located adjacent thereto.

2. A shaving implement comprising a movable toothed cutter, and a co-operating stationary plate having spaced projections in its edge, each projection including a vertically disposed rounded guard fin separating oppositely arranged thin-edged lifting blades.

3. A shaving implement comprising a series of spaced vertical guard fins, a thin-edged lifting blade associated with each guard fin and having a diverging shearing face, and a relatively movable toothed shearing plate.

4. A shaving implement comprising co-operating relatively movable plates both provided with shearing projections, the projections of one plate each including an upright fin having a rounded end and a curved shoulder at one side of the fin providing a lifting surface and a shearing surface converging to a thin edge located in advance of the shearing line.

5. A shaving implement comprising co-operating relatively movable plates provided with overlapping shearing projections, the projections of one plate being shorter than those of the other plate and the longer projections each including a round-end guard fin arranged between two shoulders, each of the shoulders having a flat shearing face and a curved lifting face, said faces converging to a thin edge in advance of the shorter set of projections.

6. A shaving implement comprising a reciprocating plate having spaced teeth in one edge, and a stationary superposed plate having correspondingly spaced teeth overlapping those of the reciprocating plate and each including a centrally disposed guard fin, a thin-edged lifting blade disposed on each face of the fin and inclined away therefrom at its forward edge and an overhanging shear face.

7. A shaving implement comprising a toothed cutter, and a cooperating plate having spaced projections in its edge, each projection carrying a shearing surface, a blunt nosed fin and a lifting blade, the fins being spaced apart substantially .024".

8. A shaving implement comprising a stationary plate having a series of perpendicular guard fins flanked by flat lifting blades with edges which converge into spaced hair-receiving spaces bounded by side shearing edges, and a plate having shear teeth movable across said hair-receiving spaces.

9. A shaving implement comprising cooperating plates having openings forming superposed shear teeth, the openings in one of said plates being bounded at opposite edges by curved lifting shoulders.

JOSEPH MUROS.